(12) United States Patent
Ono

(10) Patent No.: US 7,513,173 B2
(45) Date of Patent: Apr. 7, 2009

(54) PARALLEL LINK MECHANISM AND INDUSTRIAL ROBOT

(75) Inventor: Masatoshi Ono, Suwa (JP)

(73) Assignee: Seiko Epson Corporation (JP)

( * ) Notice: Subject to any disclaimer, the term of this patent is extended or adjusted under 35 U.S.C. 154(b) by 227 days.

(21) Appl. No.: 11/582,942

(22) Filed: Oct. 17, 2006

(65) Prior Publication Data

US 2007/0110555 A1    May 17, 2007

(30) Foreign Application Priority Data

Oct. 19, 2005  (JP) ............................. 2005-304824
Jun. 20, 2006  (JP) ............................. 2006-170734

(51) Int. Cl.
*B25J 17/00*     (2006.01)

(52) U.S. Cl. .............. 74/490.03; 74/490.05; 74/490.07; 74/640; 414/917; 901/15; 901/23

(58) Field of Classification Search . 74/490.01–490.05, 74/490.07, 640; 414/680, 917, 918; 901/15, 901/23, 24; 700/245
See application file for complete search history.

(56) References Cited

U.S. PATENT DOCUMENTS

| | | | | |
|---|---|---|---|---|
| 4,062,601 A | * | 12/1977 | Pardo et al. .................... | 74/640 |
| 4,096,766 A | * | 6/1978 | Pardo et al. .................... | 74/640 |
| 4,601,216 A | * | 7/1986 | Inoue et al. .................... | 74/640 |
| 4,742,729 A | * | 5/1988 | Cordara ........................ | 74/640 |
| 4,784,014 A | * | 11/1988 | Bruns et al. ................... | 74/640 |
| 4,787,262 A | * | 11/1988 | Kozawa et al. ........... | 74/490.06 |
| 4,864,888 A | * | 9/1989 | Iwata .......................... | 74/640 |
| 4,928,556 A | * | 5/1990 | Matsumoto et al. ......... | 475/149 |

(Continued)

FOREIGN PATENT DOCUMENTS

EP    1 671 756 A1    6/2006

(Continued)

*Primary Examiner*—Richard W L Ridley
*Assistant Examiner*—Phillip Johnson
(74) *Attorney, Agent, or Firm*—Harness, Dickey & Pierce, P.L.C.

(57) ABSTRACT

A parallel link mechanism includes a first arm, a second arm, a first auxiliary link, a second auxiliary link, and a drive motor. A cylindrical connection shaft having a first rotational axis is provided near the proximal portion of the first arm. The proximal portion of the first arm is rotatably connected to a fixed base through the connection shaft. The distal portion of the second arm is rotatably connected to a movable base. The proximal portion of the second arm is rotatably connected to the distal portion of the first arm through a connecting portion connected to a transmission mechanism. The first auxiliary link forms a first parallel link together with the first arm, the connecting portion, and the fixed base. The second auxiliary link forms a second parallel link together with the second arm, the connecting portion, and the movable base. The drive motor drives the transmission mechanism to pivot the first arm and the second arm. The drive motor includes a motor shaft having a second rotational axis. The drive motor is fixed to either the first arm or the connection shaft with the second rotational axis being offset from the first rotational axis in a radial direction of the connection shaft in such a manner that, when the first arm rotates about the first rotational axis, the drive motor is allowed to rotate about the first rotational axis together with the first arm.

8 Claims, 5 Drawing Sheets

U.S. PATENT DOCUMENTS

| | | | | |
|---|---|---|---|---|
| 4,955,250 A | * | 9/1990 | Fisher | 74/490.05 |
| 5,042,322 A | * | 8/1991 | Hofmann | 74/640 |
| 5,050,450 A | * | 9/1991 | Nakamura | 74/665 M |
| 5,054,332 A | * | 10/1991 | Terauchi et al. | 74/490.04 |
| 5,222,409 A | * | 6/1993 | Dalakian | 74/479.01 |
| 5,906,142 A | * | 5/1999 | Shirasawa | 74/640 |
| 2001/0052735 A1 | * | 12/2001 | Sakamoto | 310/75 R |
| 2002/0007697 A1 | * | 1/2002 | Tanioka et al. | 74/640 |
| 2002/0161481 A1 | * | 10/2002 | Uratani | 700/245 |
| 2005/0087034 A1 | * | 4/2005 | Friedrich et al. | 74/490.03 |

FOREIGN PATENT DOCUMENTS

| | | | |
|---|---|---|---|
| JP | 62-213990 | | 9/1987 |
| JP | 2002-326181 | | 11/2002 |
| JP | 2002-326182 | | 11/2002 |
| JP | 2002326182 A | * | 11/2002 |
| JP | 2003-094376 | | 4/2003 |
| JP | 2005-066762 | | 3/2005 |
| JP | 2007-044840 | | 2/2007 |

* cited by examiner

PARALLEL LINK MECHANISM AND INDUSTRIAL ROBOT

CROSS-REFERENCE TO RELATED APPLICATIONS

This application is based upon and claims the benefit of priority from prior Japanese Patent Application No. 2005-304824, filed on Oct. 19, 2005 and Japanese Patent Application No. 2006-170734, filed on Jun. 20, 2006, the entire contents of which are incorporated herein by reference.

BACKGROUND

1. Technical Field

The present invention relates to a parallel link mechanism and an industrial robot.

2. Related Art

General requirements for industrial robots include increased operation speed, improved operation accuracy, and, in certain operation sites, enhanced cleanliness. Particularly, there are demands that the industrial robots be used under particular circumstance involving use of specific gases or chemicals. One known vertical movement shaft mechanism of a SCARA robot includes a ball screw provided in a vertical movement shaft. The mechanism has a bellows as a protecting member for preventing generation of dust and leakage of grease from the interior of an arm. Through contraction of the bellows, the vertical movement shaft mechanism ensures improved cleanliness while maintaining operation speed and operation accuracy at relatively high levels.

However, when the bellows contracts, the pressure in the vertical movement shaft mechanism changes, inducing the dust generation and the grease leakage. It is thus difficult to maintain the increased cleanliness of the vertical movement shaft mechanism having the bellows. Further, to sufficiently prolong mechanical life of the bellows of the vertical movement shaft mechanism, the bellows must be formed of material selected from a limited range. This makes it difficult to operate the vertical movement shaft mechanism having the bellows under the aforementioned particular circumstances.

To solve the problem, a vertical movement shaft mechanism of an industrial robot including a parallel link mechanism, but not a bellows, has been proposed. Specifically, as described in JP-A-2002-326181, first arm is connected to a fixed base and a connection base while second arm is connected to the connection base and a movable base. A drive motor is provided in the fixed base. A spur gear is arranged in the interior of the connection base. The drive motor rotates the spur gear through a reducer. The spur gear thus transmits rotational force to the two arms, selectively raising and lowering the movable base.

However, in this mechanism, the drive motor, or a drive source, is fixed to the fixed base. Therefore, when assembling the industrial robot, the rotational axis of the drive motor must coincide with the rotational axis of the arms. This complicates assembly of the industrial robot.

To maintain relatively high cleanliness of the industrial robot, cables are arranged in the fixed base or the arms. For enabling such internal wiring, the industrial robot employs a hollow motor as a drive motor. This enlarges the sizes of devices provided in the industrial robot.

SUMMARY

An advantage of some aspects of the invention is to provide an easy-to-install parallel link mechanism and an easy-to-assemble industrial robot that enable easy internal wiring without employing a hollow motor as a drive motor.

According to an aspect of the invention, a parallel link mechanism including a first arm, a second arm, a first auxiliary link, a second auxiliary link, and a drive motor is provided. The first arm has a proximal portion and a distal portion. A cylindrical connection shaft having a first rotational axis is provided near the proximal portion of the first arm. The proximal portion of the first arm is rotatably connected to a fixed base through the connection shaft. The second arm has a proximal portion and a distal portion. The distal portion of the second arm is rotatably connected to a movable base. The proximal portion of the second arm is rotatably connected to the distal portion of the first arm through a connecting portion connected to a transmission mechanism. The first auxiliary link forms a first parallel link together with the first arm, the connecting portion, and the fixed base. The second auxiliary link forms a second parallel link together with the second arm, the connecting portion, and the movable base. The drive motor drives the transmission mechanism to pivot the first arm and the second arm. The drive motor includes a motor shaft having a second rotational axis. The drive motor is fixed to either the first arm or the connection shaft with the second rotational axis being offset from the first rotational axis in a radial direction of the connection shaft in such a manner that, when the first arm rotates about the first rotational axis, the drive motor is allowed to rotate about the first rotational axis together with the first arm.

According to another aspect of the invention, an industrial robot including a first parallel link, a second parallel link, a first output shaft, a second output shaft, a cylindrical connection shaft, and a fixing portion. The first parallel link has a fixed base, a connection base, a first arm, and a first auxiliary link. The first arm includes a proximal portion rotatably connected to the fixed base and a distal portion rotatably connected to the connection base. The first auxiliary link has a proximal portion rotatably connected to the fixed base and a distal portion rotatably connected to the connection base. The first auxiliary link is arranged parallel with the first arm. The second parallel link has the connection base, a movable base, a second arm, and a second auxiliary link. The second arm includes a proximal portion rotatably connected to the connection base and a distal portion rotatably connected to the movable base. The second auxiliary link has a proximal portion rotatably connected to the connection base and a distal portion rotatably connected to the movable base. The first output shaft is provided near the distal portion of the first arm. The first output shaft converts drive force of a drive motor and outputs the drive force to the connection base. The second output shaft is provided near the distal portion of the first arm. The second output shaft converts the drive force of the drive motor and outputs the drive force to the second arm. The cylindrical connection shaft is provided near the proximal portion of the first arm. The connection shaft rotatably connects the first arm to the fixed base. The first arm rotates about a first rotational axis. The drive motor has a motor shaft rotating about a second rotational axis. The fixing portion fixes the drive motor to either the first arm or the connection shaft with the second rotational axis being offset from the first rotational axis in a radial direction of the connection shaft.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

An embodiment of the present invention will now be described with reference to FIGS. 1 to 4.

Figure 1:
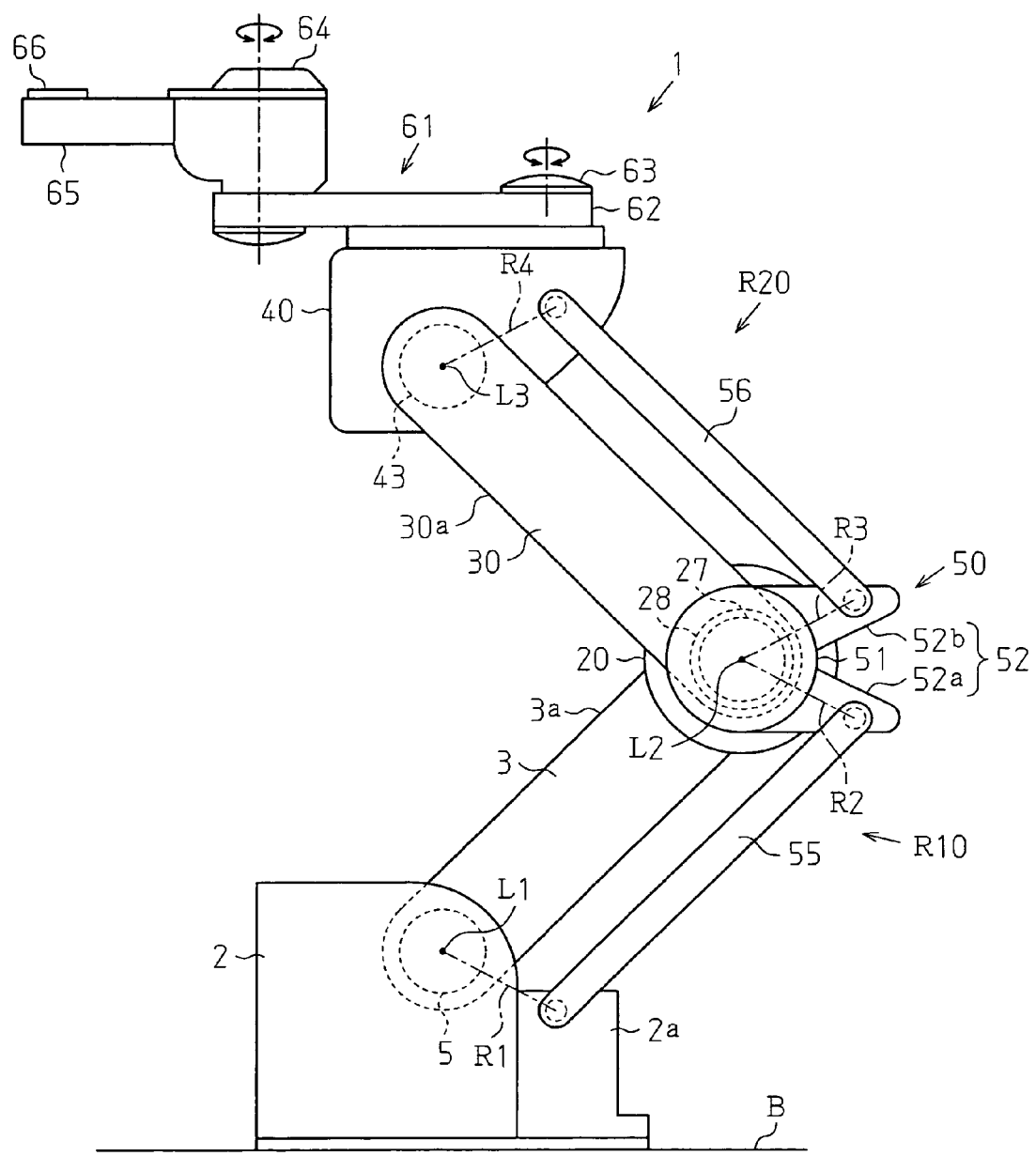
FIG. 1 is a side view showing an industrial robot according to an embodiment of the present invention.
Figure 2:
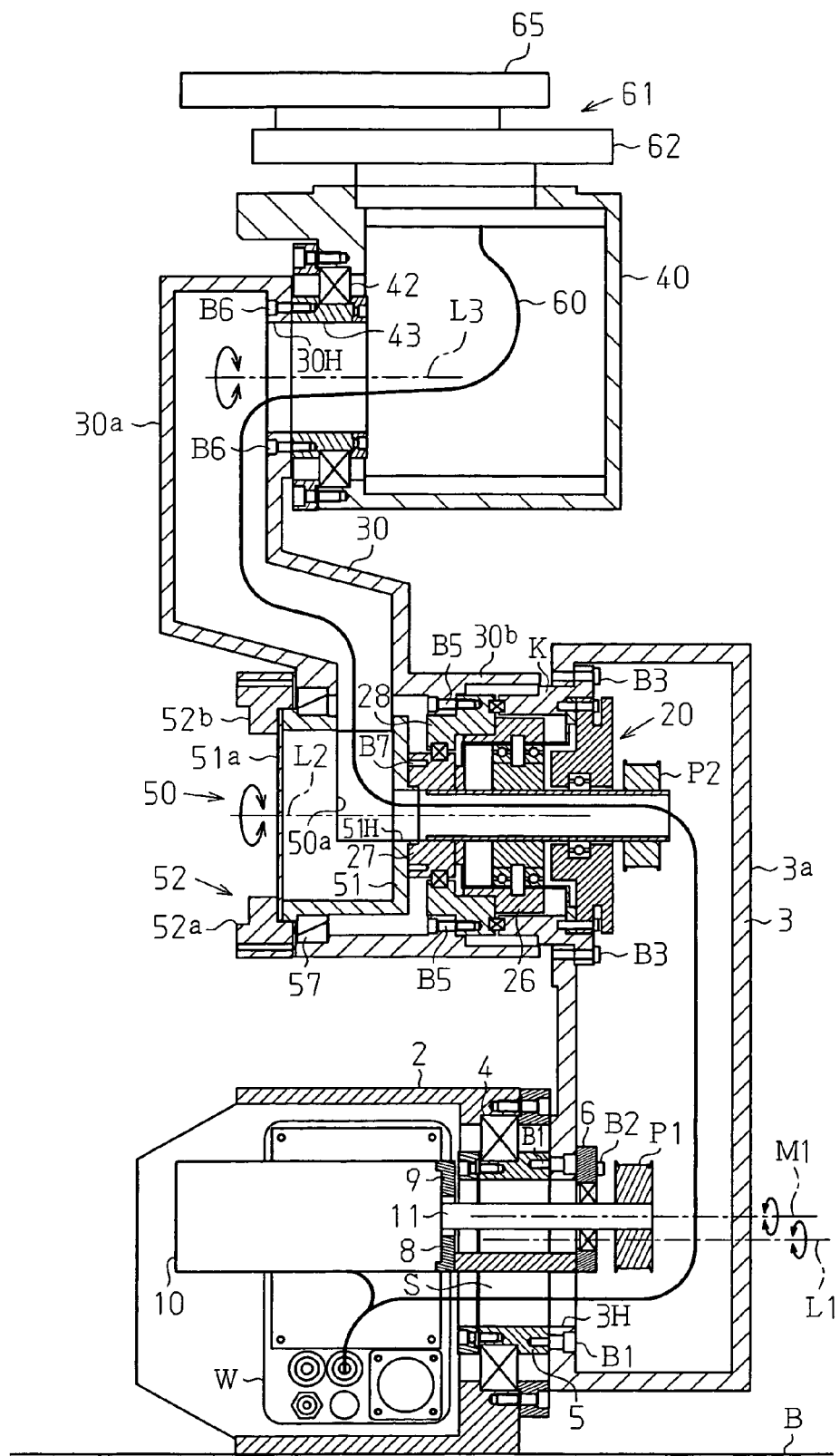
FIG. 2 is a cross-sectional view showing the industrial robot of FIG. 1.

As shown in FIG. 1, an industrial robot 1 has a substantially parallelepiped fixed base 2 fixed to a floor surface B. As shown in FIG. 2, the fixed base 2 has a cylindrical first connection shaft 5 that is rotatably supported by a bearing 4. The proximal portion of a first arm 3 is connected to the first connection shaft 5. In other words, a first connection shaft 5 is provided near the proximal portion of the first arm 3, which is connected to the fixed base 2 through the first connection shaft 5. Specifically, a through hole 3H is defined in the proximal portion of the first arm 3 and extends through the first arm 3, allowing communication between the interior and the exterior of the first arm 3. The first connection shaft 5 is secured to an outer wall portion of the through hole 3H through securing bolts B1. The connecting portion between the first connection shaft 5 and the first arm 3 is sealed by an O ring (not shown). The first arm 3 has a first arm cover 3a, which defines a sealed space in the first arm 3.

The first arm 3 rotates about the axis L1 (a first rotational axis) of the first connection shaft 5 (the through hole 3H). When the first arm 3 rotates about the axis L1, the space in the fixed base 2 and the space in the first arm 3 are maintained in a sealed state.

Figure 3:
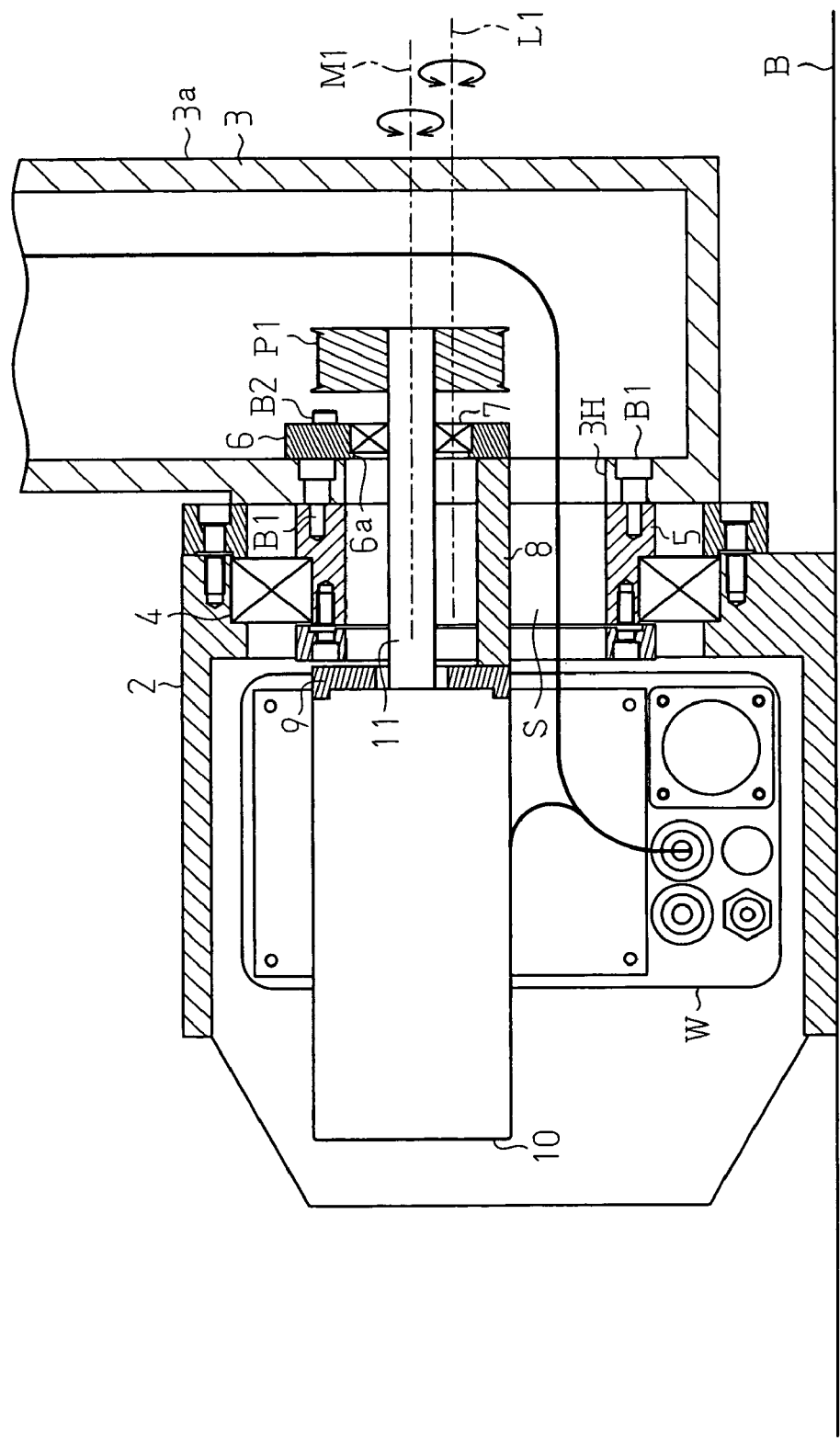
FIG. 3 is an enlarged cross-sectional view showing the industrial robot of FIG. 1.

As shown in FIG. 3, a disk-like flange 6 is fixedly connected to an inner wall portion of the through hole 3H. The outer diameter of the flange 6 is smaller than the inner diameter of the through hole 3H (the inner diameter of the first connection shaft 5) of the first arm 3. A bearing hole 6a is defined at the center of the flange 6 and receives a bearing 7.

An upper side of the flange 6 as viewed in FIG. 3 is secured to an upper inner wall portion of the through hole 3H as viewed in the drawing through a securing bolt B2. The axis M1 of the bearing hole 6a (a second rotational axis) thus becomes offset from the axis L1 of the first connection shaft 5 (the first rotational axis) in an upward direction as viewed in FIG. 3. Therefore, the flange 6 blocks a restricted portion of the through hole 3H (a restricted portion of the hollow portion of the first connection shaft 5) in correspondence with the offset amount of the axis M1, thus defining a space S that permits communication between the space in the fixed base 2 and the space in the first arm 3. When the first arm 3 pivots about the axis L1, the flange 6 pivots about the axis L1 together with the first arm 3. This maintains the space S in the through hole 3H and the hollow portion of the first connection shaft 5.

A support member 8 is formed integrally with the side of the flange 6 corresponding to the fixed base 2. The support member 8 extends through the inside of the first connection shaft 5 into the space in the fixed base 2. A fixing portion 9 is formed integrally with the side of the support member 8 corresponding to the fixed base 2. A drive motor 10 is fixed to the fixing portion 9. A motor shaft 11 of the drive motor 10 extends through the bearing hole 6a of the flange 6 into the space in the first arm 3. A pulley P1, or a part of a connection-drive member, is connected to the distal end of the motor shaft 11.

The motor shaft 11 is rotatably supported by a bearing 7. The axis of the motor shaft 11 coincides with the axis M1 of the bearing hole 6a. The motor shaft 11 of the drive motor 10 thus becomes offset from the axis L1 of the first connection shaft 5 in an upward direction as viewed in FIG. 3. Therefore, the drive motor 10 blocks a restricted portion of the through hole 3H (a restricted portion of the hollow portion of the first connection shaft 5) in correspondence with the offset amount of the motor shaft 11, thus defining the space S that permits communication between the space in the fixed base 2 and the space in the first arm 3. When the first arm 3 pivots about the axis L1, the drive motor 10 pivots about the axis L1 together with the first arm 3. This maintains the space S in the through hole 3H and the hollow portion of the first connection shaft 5.

Accordingly, a relatively large hollow passage is maintained along a path extending from the fixed base 2 to the first arm 3. This permits arrangement of lines or tubes in the space extending from the fixed base 2 to the first arm 3, without employing a hollow motor as the drive motor 10.

The position of the drive motor 10 is determined solely in correspondence with the position of the first arm 3. This makes it unnecessary to arrange the motor shaft 11 on the axis L1. That is, arrangement of the motor shaft 11 of the drive motor 10 does not have to be adjusted in such a manner that the motor shaft 11 coincides with the pivotal axis of the first arm 3. Assembly of the industrial robot 1 is thus facilitated.

The drive motor 10 is secured to the first connection shaft 5 through the motor shaft 11, which extends through the hollow portion of the first connection shaft 5. Accordingly, compared to a case in which the motor shaft 11 is provided in the space in the fixed base 2 or the space in the first arm 3, the dimension of the industrial robot 1 in the direction defined by the axis L1 decreases by an amount corresponding to the length of the motor shaft 11.

Figure 4:
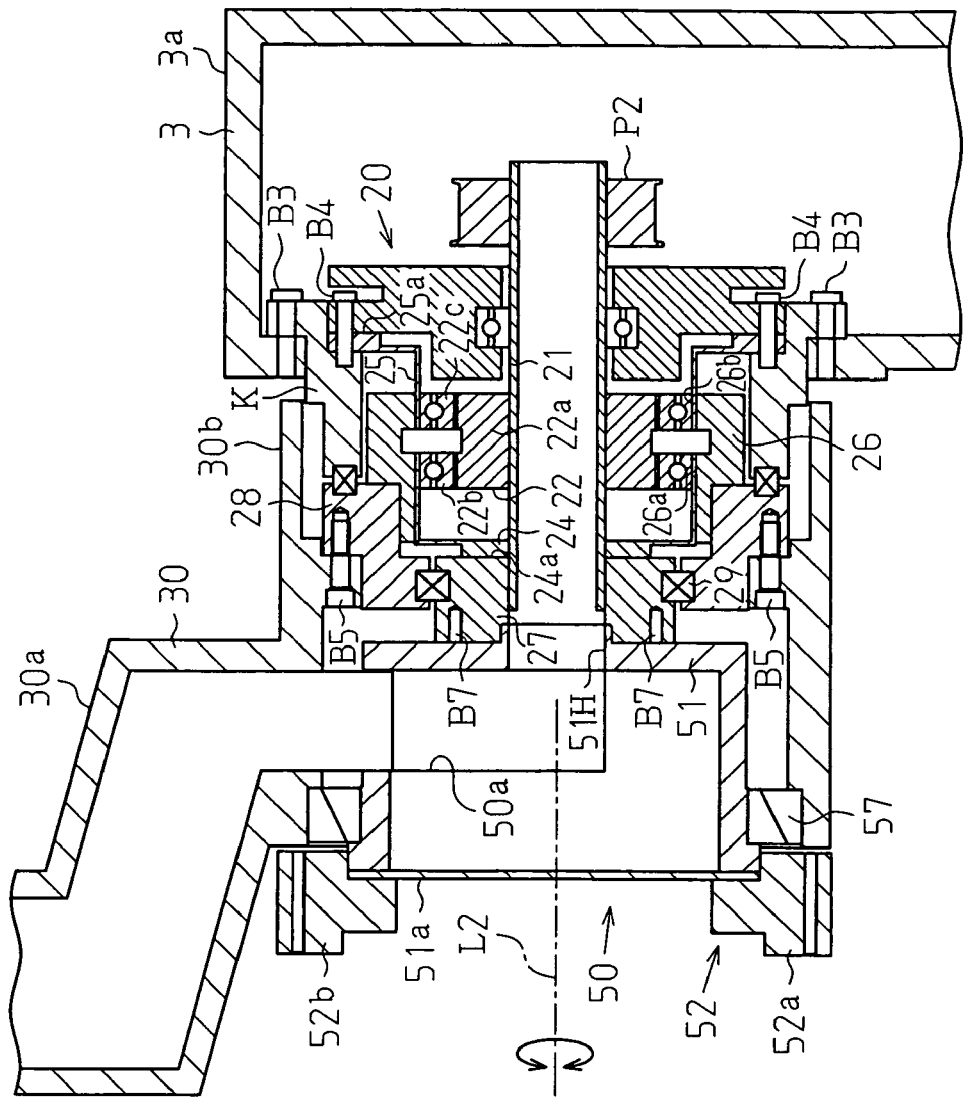
FIG. 4 is an enlarged cross-sectional view showing a harmonic drive gear reducer provided in the industrial robot of FIG. 1.

As shown in FIGS. 2 and 4, a harmonic drive gear reducer 20, or a transmission mechanism, is arranged at an upper end of the first arm 3. A body cover K of the harmonic drive gear reducer 20 is fixedly connected to the first arm 3 through connection bolts B3. Referring to FIG. 4, the harmonic drive gear reducer 20 has a cylindrical input shaft 21. A pulley P2, another part of the connection-drive member, is connected to the input shaft 21. The pulley P2 is operably connected to the pulley P1, which is connected to the motor shaft 11, through a non-illustrated belt. The rotational force generated by the drive motor 10 is thus transmitted to the pulley P2.

The input shaft 21 has a wave generator 22. The wave generator 22 has an oval cam portion 22a, a first ball bearing 22b, and a second ball bearing 22c. The cam portion 22a is secured to the input shaft 21. The first and second ball bearings 22b, 22c are arranged along the outer circumference of the cam portion 22a as opposed to each other. When the input shaft 21 rotates about the axis L2, the inner rings of the first and second ball bearings 22b, 22c rotate about the axis L2 integrally with the cam portion 22a.

A first flexspline 24 is formed around the outer ring of the first ball bearing 22b. The first flexspline 24 has a substantially cup-like shape. The opening of the first flexspline 24 is formed of an elastic metal body. The inner wall of the opening of the first flexspline 24 is held in contact with the outer ring of the first ball bearing 22b. When the input shaft 21 (the cam portion 22a) rotates about the axis L2, the portion of the first flexspline 24 corresponding to the opening elastically deforms in an oval shape along the outer peripheral surface of the cam portion 22a. Teeth (not shown) are formed on the outer peripheral surface of the portion of the first flexspline 24 corresponding to the opening. A first output shaft 27 is secured to a proximal portion 24a of the first flexspline 24 through non-illustrated connection bolts. The first output shaft 27 is rotatably supported by the input shaft 21 and rotates about the axis L2.

A second flexspline 25 is formed around the outer ring of the second ball bearing 22c. The second flexspline 25 has a substantially silk-hat-like shape. The cylindrical portion of the second flexspline 25 is formed of an elastic metal body. The inner peripheral surface of the cylindrical portion of the second flexspline 25 is held in contact with the outer ring of the second ball bearing 22c. When the input shaft 21 (the cam portion 22a) rotates about the axis L2, the cylindrical portion of the second flexspline 25 elastically deforms in an oval shape along the outer peripheral surface of the cam portion 22a. Teeth (not shown) are formed on the outer peripheral surface of the cylindrical portion of the second flexspline 25. The second flexspline 25 has a flange 25a secured to the cover K through securing bolts B4.

A cylindrical circular spline 26 is arranged at outer sides of the first and second flexsplines 24, 25. A second output shaft 28 is connected to an outer side of the circular spline 26 through non-illustrated connection bolts. The second output shaft 28 is rotatably supported by the first output shaft 27 through a bearing 29 arranged at an outer side of the first output shaft 27. When the circular spline 26 rotates, the second output shaft 28 rotates about the axis L2.

A left gear portion 26a and a right gear portion 26b are formed at the inner circumference of the circular spline 26 and engaged with the first flexspline 24 and the second flexspline 25, respectively. The left gear portion 26a has a greater number of teeth than the first flexspline 24. The left gear portion 26a becomes engaged with the first flexspline 24 solely in a direction defined by the longitudinal axis of the cam portion 22a. The right gear portion 26b has a greater number of teeth than the second flexspline 25. The right gear portion 26b becomes engaged with the second flexspline 25 solely in a direction defined by the longitudinal axis of the cam portion 22a.

Since the left gear portion 26a has more teeth than the first flexspline 24, each of the teeth of the left gear portion 26a rotates the engaged one of the teeth of the first flexspline 24 in a counterclockwise direction in a single cycle of clockwise rotation of the input shaft 21. In other words, when the input shaft 21 rotates, the circular spline 26 rotates the first output shaft 27 relative to the first flexspline 24 in the direction opposite to the rotational direction of the input shaft 21. The circular spline 26 rotates the first output shaft 27 in accordance with the reduction ratio corresponding to the difference between the number of the teeth of the left gear portion 26a and the number of the teeth of the first flexspline 24.

Since the right gear portion 26b has more teeth than the second flexspline 25, each of the teeth of the right gear portion 26b rotates the engaged one of the teeth of the second flexspline 25 in a counterclockwise direction in a single cycle of clockwise rotation of the input shaft 21. In other words, when the input shaft 21 rotates, the circular spline 26 rotates the second output shaft 28 relative to the second flexspline 25 (the first arm 3) in the direction opposite to the rotational direction of the input shaft 21. The circular spline 26 rotates the second output shaft 28 in accordance with the reduction ratio corresponding to the difference between the number of the teeth of the right gear portion 26b and the number of the teeth of the second flexspline 25.

That is, the first output shaft 27 receives rotation of the input shaft 21 that has been converted into rotation in the opposite direction and reduced by the first flexspline 24 and the left gear portion 26a of the circular spline 26. Similarly, the second output shaft 28 receives rotation of the input shaft 21 that has been converted into rotation in the opposite direction and reduced by the second flexspline 25 and the right gear portion 26b of the circular spline 26.

The ratio of the reduction ratio of the first output shaft 27 to the input shaft 21 and the reduction ratio of the second output shaft 28 to the input shaft 21 can be varied by changing the number of the teeth of the first flexspline 24, the number of the teeth of the second flexspline 25, the number of the teeth of the left gear portion 26a, and the number of the teeth of the right gear portion 26b. In the illustrated embodiment, the number of the teeth of each of these components is selected so that the ratio of the reduction ratio of the first output shaft 27 to the input shaft 21 and the reduction ratio of the second output shaft 28 to the input shaft 21 become 2:1. In other words, the second output shaft 28 of the illustrated embodiment rotates in the same direction as that of the first output shaft 27 at a rotational angle twice as large as that of the first output shaft 27.

The lower end of the second arm 30 is connected to the second output shaft 28. Specifically, the second arm 30 is secured to the second output shaft 28 through connection bolts B5 in such a manner that a cylindrical portion 30b, which is provided at a lower end of the second arm 30, encompasses the outer circumference of the second output shaft 28.

Referring to FIG. 2, the upper end of the second arm 30 is connected to a movable base 40 having a substantially box-like shape. The movable base 40 has a cylindrical second connection shaft 43 rotatably supported by a bearing 42. A through hole 30H is defined in the upper end of the second arm 30. The second connection shaft 43 is secured to an outer wall portion of the through hole 30H through securing bolts B6. The second arm 30 is rotatably connected to the movable base 40 and rotates about the axis L3 of the second connection shaft 43. The second connection shaft 43 and the second arm 30 are hollow. The second arm 30 is sealed by a second arm cover 30a. The connecting portion between the second connection shaft 43 and the second arm 30 is sealed by a non-illustrated O-ring.

As shown in FIG. 4, a connection base 50, which is arranged at a position outer than the second arm 30 (at the left-hand side as viewed in FIG. 2), is secured to the first output shaft 27 of the harmonic drive gear reducer 20. The connection base 50 has a cup-like connecting portion 51 and an extended portion 52 secured to the connecting portion 51. The connecting portion 51 is fixedly connected to the first output shaft 27 through connection bolts B7. A through hole 51H is defined at the center of the connecting portion 51 and communicates with the space in the input shaft 21 of the harmonic drive gear reducer 20. The connecting portion 51 has a communicating portion 50a that extends from the through hole 51H to the second arm 30. The communicating portion 50a allows communication between the space in the input shaft 21 and the space in the second arm 30. The connecting portion 51 has a communicating portion cover 51a, which seals the space between the input shaft 21 and the second arm 30.

In other words, the industrial robot 1 has the space (the passage) extending from the interior of the fixed base 2 to the interior of the movable base 40 along the path including the interiors of the first connection shaft 5, the first arm 3, the harmonic drive gear reducer 20, the communicating portion 50a, the second arm 30, and the second connection shaft 43. Referring to FIG. 2, a wiring tube 60 extends from the fixed base 2 to the movable base 40 while passing through these components throughout the space (the passage). The proximal end of the wiring tube 60 is connected to a wiring substrate W or a valve (not shown) provided in the fixed base 2.

As shown in FIG. 1, a lower extended piece 52a and an upper extended piece 52b extend from an extended portion 52 of the connection base 50.

The upper end of a first auxiliary link 55 is rotatably connected to the lower extended piece 52a. The lower end of the first auxiliary link 55 is rotatably connected to an extended frame portion 2a of the fixed base 2. The line extending from the lower connection point of the first arm 3 to the lower connection point of the first auxiliary link 55 is referred to as a first parallel line R1. The line extending from the upper connection point of the first arm 3 to the upper connection point of the first auxiliary link 55 is referred to as a second parallel line R2. The first arm 3, the first auxiliary link 55, the first parallel line R1, and the second parallel line R2 each correspond to one of the sides of a parallelogram. Further, the first arm 3, the first auxiliary link 55, the fixed base 2, and the connection base 50 form a first parallel link mechanism R10 in which the first parallel line R1 is constant.

The lower end of a second auxiliary link 56 is rotatably connected to the upper extended piece 52b. The upper end of the second auxiliary link 56 is rotatably connected to the movable base 40. The line extending from the lower connection point of the second arm 30 to the lower connection point of the second auxiliary link 56 is referred to as a third parallel line R3. The line extending from the upper connection point of the second arm 30 to the upper connection point of the second auxiliary link 56 is referred to as a fourth parallel line R4. The second arm 30, the second auxiliary link 56, the third parallel line R3, and the fourth parallel line R4 each correspond to one of the sides of a parallelogram. Further, the second arm 30, the second auxiliary link 56, the connection base 50, and the movable base 40 form a second parallel link mechanism R20.

A robot arm mechanism 61 is provided on the movable base 40. The robot arm mechanism 61 has a first horizontal arm 62 and a first joint shaft 63. The first horizontal arm 62 rotates about the first joint shaft 63. A second joint shaft 64 and a second horizontal arm 65 are provided at the distal end of the first horizontal arm 62. The second horizontal arm 65 rotates about the second joint shaft 64, which is provided at the proximal end of the second horizontal arm 65. An operation shaft 66 is rotatably supported by the distal end of the second horizontal arm 65. An end effecter such as a hand device (not shown) is secured to the operation shaft 66.

Operation of the industrial robot 1 will hereafter be explained.

Figure 5:
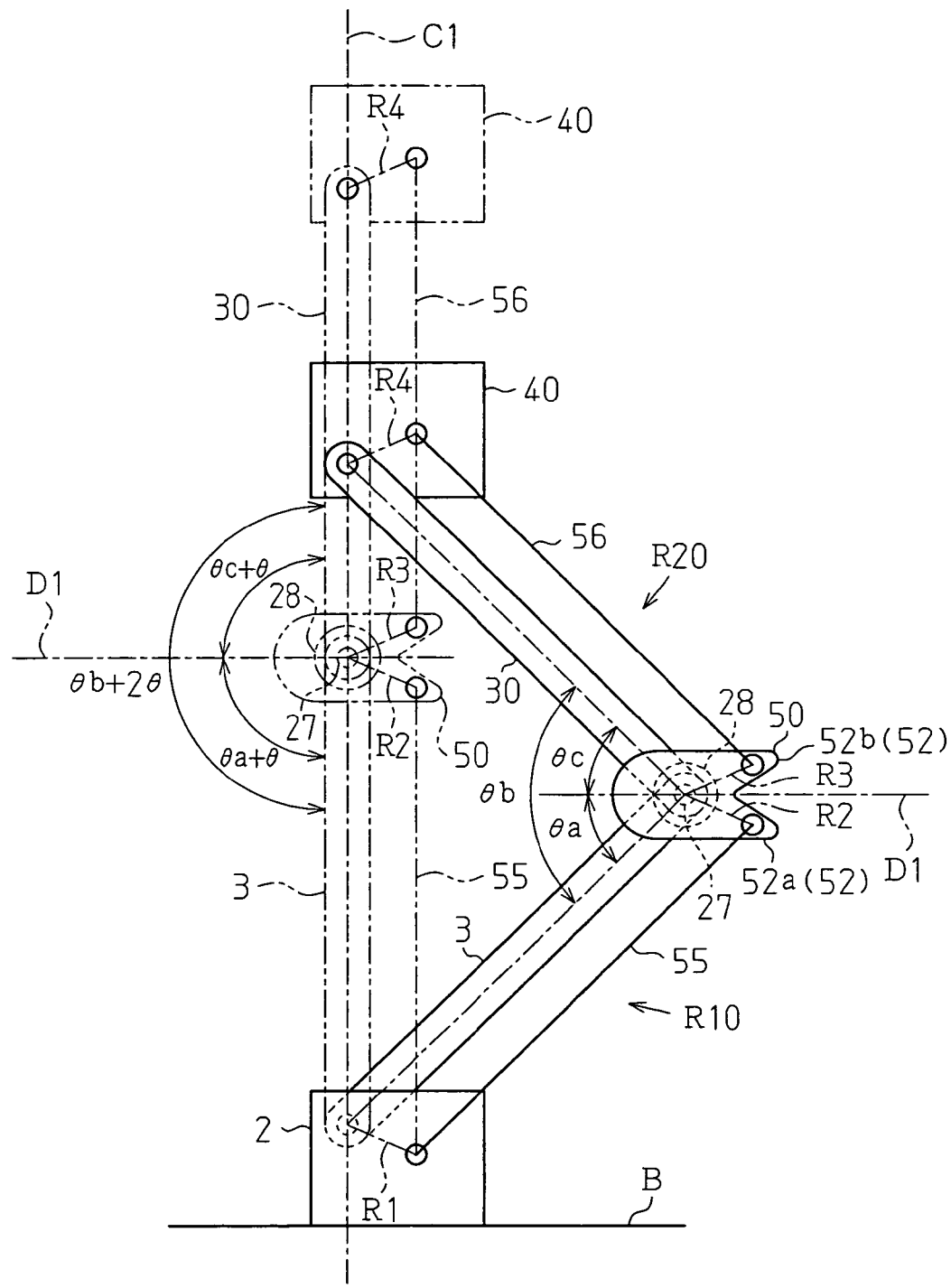
FIG. 5 is a diagram representing operation of the industrial robot of FIG. 1.

Specifically, operation of the industrial robot 1 when the movable base 40 moves from the position indicated by the sold lines of FIG. 5 to the position indicated by the chain double-dashed lines of the drawing will be described.

To pivot the first arm 3 and the second arm 30, the drive motor 10 is actuated to rotate the input shaft 21 of the harmonic drive gear reducer 20 through the pulleys P1, P2 in a counterclockwise direction. This causes the first output shaft 27 to rotate in a clockwise direction, the opposite direction of the rotational direction of the input shaft 21, through the first flexspline 24 and the left gear portion 26a of the circular spline 26. The first output shaft 27 adjusts the angle θa through rotation.

The second output shaft 28 rotates in the clockwise direction, or the opposite direction of the rotational direction of the input shaft 21, through the second flexspline 25 and the right gear portion 26b of the circular spline 26. The second output shaft 28 adjusts the angle θb through rotation.

When the first output shaft 27 rotates in the clockwise direction, the first parallel link mechanism R10 maintains the second parallel line R2 in a state parallel with the first parallel line R1. In other words, the first parallel link mechanism R10 pivots the first arm 3 and the first auxiliary link 55 while maintaining the horizontal line D1 of the connection base 50 parallel with the floor surface B. In this manner, the connection base 50 is moved from the position indicated by the solid lines of FIG. 5 to the position indicated by the chain double-dashed lines of the drawing (leftward and upward as viewed in FIG. 5).

When the first output shaft 27 rotates in the clockwise direction, the second output shaft 28 rotates in the clockwise direction (the same direction as the rotational direction of the first output shaft 27) at a rotational angle twice as large as that of the first output shaft 27. Specifically, if the angle θa increases by an amount corresponding to the rotational angle θ, the second output shaft 28 operates to increase the angle θb and the angle θc by an amount corresponding to the rotational angle 2θ and an amount corresponding to the rotational angle θ, respectively. That is, the second output shaft 28 always causes the angle θa and the angle θc to be equal to each other.

When the first output shaft 27 rotates in the clockwise direction, the second parallel link mechanism R20 maintains the fourth parallel line R4 in a state parallel with the third parallel line R3. Specifically, the second parallel link mechanism R20 pivots the second arm 30 and the second auxiliary link 56 while holding the movable base 40 in a horizontal state. In this manner, the movable base 40 is raised along the vertical line C1 and from the position indicated by the solid lines of FIG. 5 to the position indicted by the chain double-dashed lines of the drawing.

Contrastingly, to lower the movable base 40 from the position indicated by the chain double-dashed lines to the position indicated by the solid lines, the input shaft 21 of the harmonic drive gear reducer 20 is rotated in the clockwise direction.

The illustrated embodiment has the following advantages.

(1) In the illustrated embodiment, the first arm 3, the first connection shaft 5, the communicating portion 50a of the connection base 50, the second arm 30, the second connection shaft 43, and the movable base 40 are all hollow. The motor shaft 11 of the drive motor 10 is offset from the axis L1 of the first connection shaft 5 in a radial direction of the first connection shaft 5.

The drive motor 10 thus defines a space (the space S) with volume increased by an amount corresponding to the offset amount of the motor shaft 11 in the radial direction of the first connection shaft 5 in the first connection shaft 5, which has a relatively large inner diameter. That is, a hollow passage with increased volume is provided from the fixed base 2 to the movable base 40. The wiring tube 60 of the robot arm mechanism 61 and wires of the drive motor 10 are arranged along the hollow passage.

It is thus unnecessary to employ a hollow motor as the drive motor 10, making it also unnecessary to provide a sleeve or the like. This decreases the number of the components, reducing the industrial robot 1 in size. Further, it is unnecessary to arrange the motor shaft 11 of the drive motor 10 and the rotational axis of the first arm 3 in such a manner that the axes coincide with each other, when assembling the industrial robot 1. This facilitates assembly of the industrial robot 1.

(2) Since the wiring tube 60 is arranged inside the industrial robot 1, an auxiliary arm for cable wiring does not have to be provided. The number of the components thus decreases, reducing the weight of the industrial robot 1. Further, since the wiring tube 60 is not exposed to the exterior, operation of the parallel link mechanisms (the first parallel link mechanism R10 and the second parallel link mechanism R20) or that of the robot arm mechanism 61 are not interfered by the wiring tube 60. Also, in operation of the industrial robot 1, noise generation by the wiring tube 60 is suppressed.

(3) In the illustrated embodiment, the flange 6 is secured to the outer wall portion of the through hole 3H for supporting the drive motor 10. The drive motor 10 is arranged in the fixed base 2. Therefore, compared to a case where the drive motor 10 is secured directly to the harmonic drive gear reducer 20, influence on pivoting of the arms by the weight of the drive motor 10 can be decreased. This reduces the load acting on the drive motor 10.

(4) In the illustrated embodiment, the harmonic drive gear reducer 20, which has the single input shaft 21 and the two output shafts (the first and second output shafts 27, 28), is employed as the transmission mechanism. Thus, by actuating the drive motor 10 to rotate the input shaft 21, the first output shaft 27 and the second output shaft 28 are rotated to pivot the first arm 3 and the second arm 30, respectively. In other words, pivoting of the first arm 3 and pivoting of the second arm 30 are enabled simply by securing the connection base 50 and the second arm 30 to the first output shaft 27 and the second output shaft 28, respectively, of the harmonic drive gear reducer 20. The assembly of the industrial robot 1 is thus further facilitated. Further, the harmonic drive gear reducer 20 has a hollow portion with a relatively large diameter. The wiring tube 60 is thus easily installed in the hollow portion.

(5) In the illustrated embodiment, the distal end of the first arm 3, the axis of the first output shaft 27, the axis of the second output shaft 28, and the proximal end of the second arm 30 are aligned along a common straight line. In other words, the first output shaft 27 and the second output shaft 28 are arranged coaxially. This arrangement reduces the axial dimension of the harmonic drive gear reducer 20. Thus, compared to a case employing a spur gear, the transmission mechanism becomes smaller.

(6) In the illustrated embodiment, the connection base 50 is arranged at an outermost position of the first arm 3 and the second arm 30 (at the left-hand side of FIG. 2). This arrangement allows accurate transmission of the output of the harmonic drive gear reducer 20 to the connection base 50 and the second arm 30. This widens the range from which the output of the harmonic drive gear reducer 20 (the reduction ratio) is selected.

(7) In the illustrated embodiment, the first arm 3 and the second arm 30 are sealed by the first arm cover 3a and the second arm cover 30a, respectively. The connecting portion between the first arm 3 and the first connection shaft 5, the connecting portion between the second arm 30 and the second connection shaft 43, the connecting portion between the connection base 50 and the second arm 30 are sealed by the O-ring or the seal member 57. This increases seal performance of the industrial robot 1, further reliably suppressing dust generation or grease leakage from the interiors of the first and second arms 3, 30. Accordingly, the industrial robot 1 can operate under various specific circumstances including clean rooms.

The illustrated embodiment may be modified as follows.

Although the drive motor 10 is secured to the first arm 3 in the illustrated embodiment, the drive motor 10 may be secured to, for example, the first connection shaft 5.

In the illustrated embodiment, the first connection shaft 5 is rotatably connected to the fixed base 2 and the first arm 3 is secured to the first connection shaft 5. However, the first arm 3 and the first connection shaft 5 may be formed as an integral body that forms the first arm 3.

In the illustrated embodiment, the first output shaft 27 corresponds to the inner output shaft of the harmonic drive gear reducer 20. The second output shaft 28 corresponds to the outer output shaft of the harmonic drive gear reducer 20. However, the inner output shaft may function as the second output shaft 28 and the outer output shaft may function as the first output shaft 27. In this case, the lower end of the second arm 30 is connected to the first output shaft 27, and the connection base 50 is connected to the second output shaft 28. The connection base 50 is arranged between the upper end of the first arm 3 and the lower end of the second arm 30. The communicating portion 50a of the connection base 50 thus can be omitted. This further simplifies the structure of the connection base 50. In this case, it is preferred that the ratio of the reduction ratio of the first output shaft 27 to the input shaft 21 of the harmonic drive gear reducer 20 and the reduction ratio of the second output shaft 28 to the input shaft 21 is set to 1:2. This allows the movable base 40 to move linearly along the vertical line C1.

In the illustrated embodiment, the ratio of the reduction ratio of the first output shaft 27 to the input shaft 21 and the reduction ratio of the second output shaft 28 to the input shaft 21 is set to 2:1. However, such ratio is not restricted to this value.

Although the first output shaft 27 and the second output shaft 28 are arranged coaxially in the illustrated embodiment, arrangement of the first and second output shaft 27, 28 may be modified in any other suitable manner.

In the illustrated embodiment, the harmonic drive gear reducer 20 is secured to the upper end of the first arm 3. However, the harmonic drive gear reducer 20 may be secured to, for example, the lower end of the second arm 30 in a reversed installation state. In this case, the connection base 50 is connected to the first output shaft 27 of the harmonic drive gear reducer 20. The upper end of the first arm 3 is connected to the second output shaft 28.

In the illustrated embodiment, the harmonic drive gear reducer 20, which is a 1-input 2-output type, is employed as the transmission mechanism. However, a bevel gear, for example, may be employed and arranged in such a manner as to allow internal arrangement of the wiring tube 60.

In the illustrated embodiment, the parallel link mechanism (the first arm 3, the second arm 30, the first auxiliary link 55, the second auxiliary link 56, the connection base 50, and the harmonic drive gear reducer 20) is arranged in a manner extending on the vertical line C1. However, the parallel link mechanism may be arranged, for example, horizontally.

What is claimed is:

1. A parallel link mechanism comprising:
a first arm having a proximal portion and a distal portion, a cylindrical connection shaft having a first rotational axis being provided near the proximal portion of the first arm, the proximal portion of the first arm being rotatably connected to a fixed base through the connection shaft;

a second arm having a proximal portion and a distal portion, the distal portion of the second arm being rotatably connected to a movable base, the proximal portion of the second arm being rotatably connected to the distal portion of the first arm through a connecting portion connected to a transmission mechanism;

a first auxiliary link, the first auxiliary link forming a first parallel link together with the first arm, the connecting portion, and the fixed base;

a second auxiliary link, the second auxiliary link forming a second parallel link together with the second arm, the connecting portion, and the movable base; and a drive motor that drives the transmission mechanism to pivot the first arm and the second arm, the drive motor including a motor shaft having a second rotational axis, wherein the drive motor is arranged in the fixed base, and wherein the drive motor is fixed to either the first arm or the connection shaft with the second rotational axis being offset from the first rotational axis in a radial direction of the connection shaft in such a manner that, when the first arm rotates about the first rotational axis, the drive motor is allowed to rotate about the first rotational axis together with the first arm.

2. The parallel link mechanism according to claim 1, wherein the drive motor is fixed to either the first arm or the connection shaft through the inside of the connection shaft.

3. The parallel link mechanism according to claim 2, wherein the first arm, the second arm, the fixed base, and the movable base are hollow.

4. The parallel link mechanism according to claim 1, wherein the transmission mechanism is a harmonic drive gear reducer having an input shaft, a first output shaft, and a second output shaft.

5. The parallel link mechanism according to claim 4, wherein the first output shaft and the second output shaft are arranged coaxially.

6. The parallel link mechanism according to claim 5,
wherein the first output shaft of the harmonic drive gear reducer is connected to a connection base a portion of which is formed by the connecting portion,
wherein the second output shaft of the harmonic drive gear reducer is connected to the proximal portion of the second arm, and
wherein, in the harmonic drive gear reducer, the ratio of a reduction ratio of the first output shaft to the input shaft to a reduction ratio of the second output shaft to the input shaft is 2:1.

7. An industrial robot comprising:
a first parallel link having a fixed base, a connection base, a first arm, and a first auxiliary link, the first arm including a proximal portion rotatably connected to the fixed base and a distal portion rotatably connected to the connection base, the first auxiliary link having a proximal portion rotatably connected to the fixed base and a distal portion rotatably connected to the connection base, the first auxiliary link being arranged parallel with the first arm;

a second parallel link having the connection base, a movable base, a second arm, and a second auxiliary link, the second arm including a proximal portion rotatably connected to the connection base and a distal portion rotatably connected to the movable base, the second auxiliary link having a proximal portion rotatably connected to the connection base and a distal portion rotatably connected to the movable base;

a first output shaft provided near the distal portion of the first arm, the first output shaft converting drive force of a drive motor, which is arranged in the fixed base, and outputting the drive force to the connection base;

a second output shaft provided near the distal portion of the first arm, the second output shaft converting the drive force of the drive motor and outputting the drive force to the second arm;

a cylindrical connection shaft provided near the proximal portion of the first arm, the connection shaft rotatably connecting the first arm to the fixed base; and a fixing portion, the first arm rotating about a first rotational axis, the drive motor having a motor shaft rotating about a second rotational axis, the fixing portion fixing the drive motor to either the first arm or the connection shaft with the second rotational axis being offset from the first rotational axis in a radial direction of the connection shaft.

8. The industrial robot according to claim 7,
wherein the distal portion of the first arm, the proximal portion of the second arm, the axis of the first output shaft, and the axis of the second output shaft are aligned along a common straight line, and
wherein the industrial robot further includes a transmission mechanism having an input shaft that receives the drive force of the drive motor, the ratio of a reduction ratio of the first output shaft to the input shaft to a reduction ratio of the second output shaft to the input shaft being 2:1.

* * * * *